(12) United States Patent
Lin et al.

(10) Patent No.: US 6,405,250 B1
(45) Date of Patent: Jun. 11, 2002

(54) NETWORK MANAGEMENT SYSTEM BASED ON PASSIVE MONITORING AND PROACTIVE MANAGEMENT FOR FORMULATION BEHAVIOR STATE TRANSITION MODELS

(75) Inventors: Yow-Jian Lin, Edison; Arun Narayan Netravali; Krishan Kumar Sabnani, both of Westfield, all of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/236,508

(22) Filed: Jan. 25, 1999

(51) Int. Cl.[7] .................. G06F 15/173; G05B 13/02
(52) U.S. Cl. .................. 709/224; 709/223; 700/29; 700/30
(58) Field of Search ................... 709/223, 224, 709/202; 370/216, 252, 236; 700/29, 30

(56) References Cited

U.S. PATENT DOCUMENTS

| | | | | |
|---|---|---|---|---|
| 5,761,502 A | * | 6/1998 | Jacobs | 707/103 |
| 6,012,152 A | * | 1/2000 | Douik et al. | 714/26 |
| 6,099,575 A | * | 8/2000 | Hardin et al. | 703/22 |
| 6,243,697 B1 | * | 6/2001 | Crowther | 706/50 |

* cited by examiner

Primary Examiner—Mehmet B. Geckil
Assistant Examiner—Beatriz Prieto
(74) Attorney, Agent, or Firm—Barry H. Freedman

(57) ABSTRACT

A network management system (NMS) and method is arranged for monitoring, controlling and managing a network that includes a set of interconnected network elements (NEs). A management agent in each NE interacts with the NMS on behalf of the NE. The system and method utilizes (a) a behavior transition model based on NE status or "health" indicators for passive monitoring, (b) a status updating mechanism with adjustable or "tunable" parameters based on operating conditions, (c) a derivation procedure for correlating ripple effects, and (d) an early-warning model for proactive management.

17 Claims, 5 Drawing Sheets

NETWORK MANAGEMENT SYSTEM BASED ON PASSIVE MONITORING AND PROACTIVE MANAGEMENT FOR FORMULATION BEHAVIOR STATE TRANSITION MODELS

FIELD OF THE INVENTION

The present invention relates to a system and method for managing the interworking of network components, and in particular, to a network management method and system using passive monitoring and proactive management.

BACKGROUND OF THE INVENTION

A data or telecommunication network consists of various kinds of interconnected network elements (NEs). For example, in a wireless network there are network elements such as base stations, mobile switching centers (MSCs), and home location registers (HLRs); a data network contains various routers, gateways, and servers. The various operations of NEs together constitute network services in a distributed fashion. Traditional network management approaches rely on periodic status polling of individual NEs, which often results in unnecessary details and excessive management traffic. Moreover, the lack of systematic approach to modeling network-wide behaviors cripples the ability of proactively taking early actions against potential catastrophic events.

SUMMARY OF THE INVENTION

In accordance with the present invention, a system and method is provided for managing a network that includes a set of interconnected network elements (NEs). A network management system (NMS) is responsible for monitoring and controlling the NE's, and a management agent in each NE interacts with the NMS on behalf of the NE. The system and method utilizes (a) a behavior transition model based on NE status or "health" indicators for passive monitoring, (b) a status updating mechanism with adjustable or "tunable" parameters based on operating conditions, (c) a derivation procedure for correlating ripple effects, and (d) an early-warning model for proactive management.

In accordance with the present invention, the NMS and the agents of the NEs collaboratively decide a proper communication strategy in terms of status updating frequency and details. Communication strategies are adjusted based on macro models of individual NEs as well as of the entire network. Depending on which situations an NE is in, the management information communicated between the NE and the NMS could be fine-grained or coarse, and the communication could be frequent or sparse.

In accordance with one aspect of the present invention, an element behavior macro model defines the operating regions of each NE in terms of combinations of selected parameter values. The element behavior macro model also describes the causes for transitions among regions, and facilitates a layered approach to defining each NE's status. This approach simplifies formulating an external view of the NE's behaviors.

In accordance with another aspect of the present invention, a flexible updating mechanism ties changes in updating rules (in terms of frequency and granularity) to transitions among operating regions. An NE or its associated proxy initiates such rules changes based on its local status to provide just-in-time updates. NMS can override the selection of rules in the interest of investigating network-wide behaviors.

In accordance with yet another aspect of the present invention, a network trend derivation procedure correlates causes of transitions in NE behavior models to capture ripple effects. The derived network trend model is the basis for passive monitoring and proactive network management.

In accordance with yet another aspect of the present invention, an early warning model derived from the network trend model reveals dangerous paths towards catastrophes. The NMS passively monitors updates from NE agents based on the trend model, and injects control whenever necessary to deviate the network from dangerous paths.

When the invention is properly implemented, it enables two powerful network management methods, namely passive monitoring and proactive management. Passive monitoring, based on an agent-initiated, situation-dependent updating mechanism, provides just-in-time status updates and minimizes management traffic overhead. On the other hand, proactive management, through a manager-anticipated, trend-driven preventive control, avoids catastrophic network failures and serious quality of service (QoS) degradation. A derived network-wide behavior model facilitates effective fault diagnosis and disaster avoidance. The network management system and method of the present invention can be implemented using various standard management protocols, such as SNMP.

DETAILED DESCRIPTION

Figure 1:
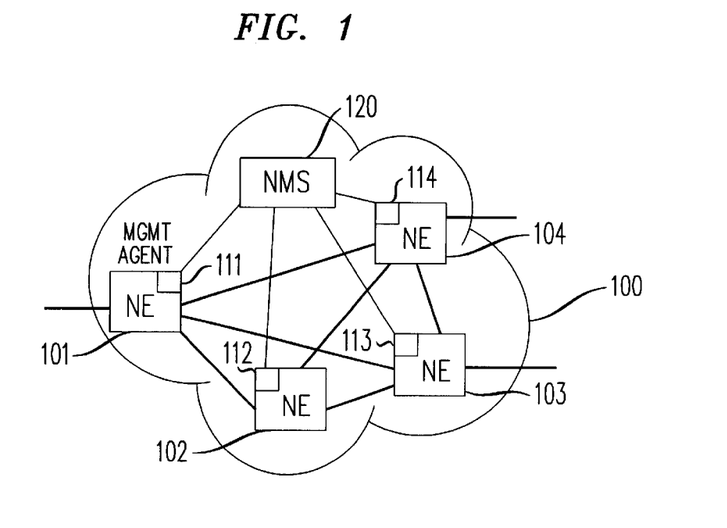
FIG. 1 is a diagram illustrating the interrelationship of a series of network elements (NE's), and a network management system (NMS) arranged in accordance with the present invention.

Referring first to FIG. 1, there is shown a network topology illustrating a series of network elements (NE's) 101–104 that are connected to each other in an administrative domain shown generally as 100. Each of the NE's includes a corresponding management agent (MA) 111–114, respectively, and each of the MA's is connected to and communicates with a network management system (NMS) 120 arranged in accordance with the present invention. Some NE's in domain 100 (such as NE's 101, 103, and 104) may also have connections into other administrative domains, not shown. The arrangement of FIG. 1 is meant to be a logical topology; its mapping to a physical network can vary. It is to be understood that NE's 101–104 can represent a wide variety of network elements, including base stations, mobile switching centers (MSCs), home location registers (HLRs), routers, gateways, and servers, as well as other elements. Also MA's 111–114 are generally implemented as information processors having the ability to store and manipulate information in accordance with program instructions, and to communicate appropriately with external elements.

One key aspect of the present invention is the creation of a behavior transition model for capturing the macro behaviors of each NE 101–104 under the influence of operating conditions in its internal and external environments. Each MA in FIG. 1 maintains a behavior transition model for its associated NE, and all of the transition models are also available in NMS 120.

The behavior description of an NE in general can be at two different levels. One focuses on functional flows, describing how the NE internally processes each element or packet of information (hereinafter referred to as a "datagram"); the other deals more with overall operating status, describing how well the NE is serving incoming datagrams. The latter is of interest, based on two assumptions: the execution of functional flows do not require constant monitoring as the implementation is reasonably robust due to rigorous testing; and, when the execution does present problems, the problems will manifest in the operating status of the NE.

The operating status (sometimes referred to as the "health") of each network element $NE_i$ (where the subscript "i" represents an integer) can be characterized by a set of parameters $P_{i=\{pk\}}$, k=1, . . . , $n_i$. Each parameter $p_k$ can take a set of values. Together these parameters and values define an $n_i$ dimensional operating space for $NE_i$. Some typical parameters are throughput, blocking rate, latency, available resources, etc., commonly included as part of the MIB (Management Information Base) supported by the management agent associated with each NE. The choice of representative parameters is application-dependent.

The operating space of $NE_i$ is further divided into a finite number of bounded areas, each of which is a state that consists of a set of operating points. Each NE, through its associated management agent, reports to NMS 120 a set of parameter values as its operating point, and NMS 120 can determine the "state" that the NE is in based on the operating point. A subsequent report from the NE indicates whether the NE is in the same state (i.e., the same set of operating points) or is in a different state. The notion of a state in the model is similar to that in an Extended Finite State Machine (EFSM) model, in the sense that each state is parameterized with a set of state variables/parameters. Note that in the model, each state (bounded area) can be defined as a set of constraints over the set of parameters. The same parameter may appear as a state variable of more than one state, with a potentially overlapped range of values at different states. Nevertheless, the combination of parameter values uniquely identifies a state.

Figure 2:
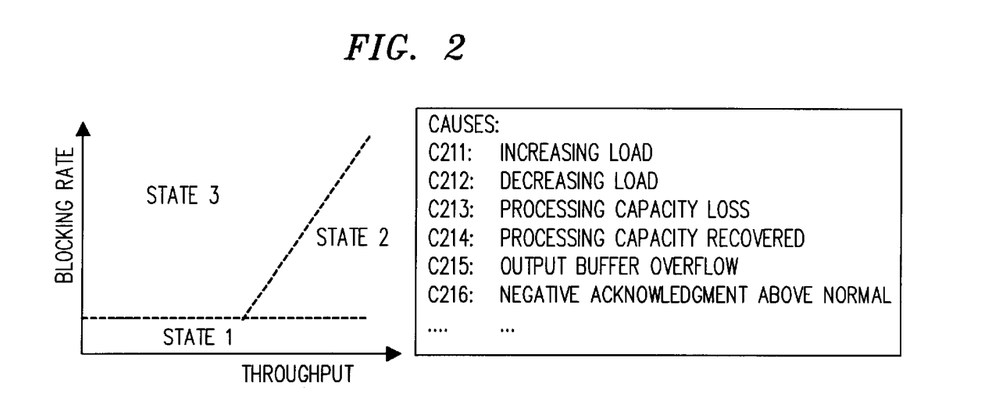
FIG. 2 is a diagram illustrating the operating states of an illustrative NE.

The concept of states is illustrated in FIG. 2, which assumes, as an example, that the network element is NE 101 of FIG. 1. For simplicity and ease of explanation, we assume in FIG. 2 that throughput (the number of datagrams successfully processed per unit of time) and blocking rate (the number of failed datagrams per unit of time) are two critical status parameters of NE 101. The operating space illustrated in FIG. 2 is divided into three areas. State 1 represents a desirable operating situation, where the blocking rate is below a threshold. State 2 corresponds to a slightly overloaded situation, where as throughput continues to increase, blocking rate increases as well. In state 3, blocking rate is uncharacteristically higher with respect to the throughput generated; this state represents an undesirable operating situation in which either NE 101 has internal faults, or some element in the network is experiencing problems.

For each $NE_i$ there is a set of causes $C_i=\{c_j\}$, j=1, . . . , $m_i$, listed in FIG. 2, that could trigger the movement of operating points and eventually the transitions among states. For example, "increasing load" is denominated cause "C211"; this cause tends to move the operating point to the right and up (increased throughput and higher blocking rate). "Decreasing load" is denominated "C212", and moves the operating point left and down; this state is characterized by decreasing throughput and lower blocking rate. "Processing capacity loss", cause C213, moves the point to the left and up; "processing capacity recovered", cause C214, moves the point right and down. "Output buffer overflow", cause C215, tends to move the point up; so does "negative acknowledgement above normal", cause C216. When a cause could result in moving the operating point across some state boundary, we label the corresponding transition with the cause. In general, each transition is labeled with a subset of $C_i$, reflecting the fact that potentially there are multiple reasons for an NE to move from one state to another.

Figure 3:
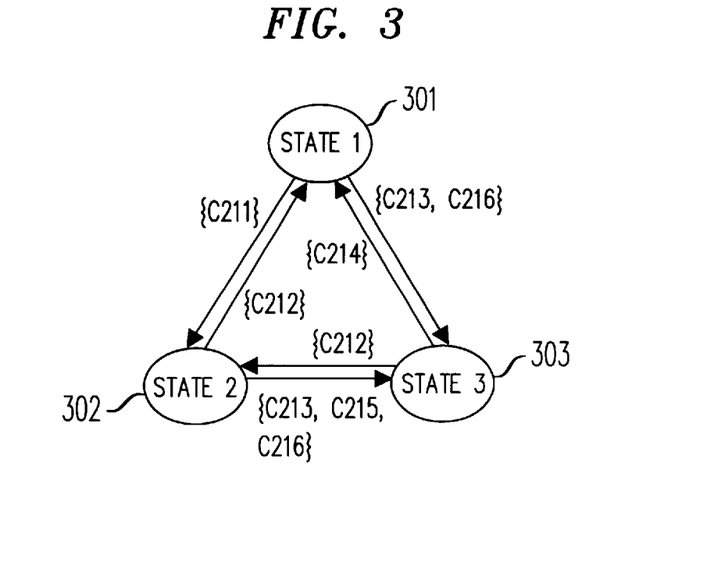
FIG. 3 is a behavior transition model for a network element of FIG. 1.

FIG. 3 is an illustrative behavior transition model for NE 101 based on the states and causes presented in FIG. 2. States 1, 2 and 3, depicted in FIG. 3 as 301–303 respectively, are each "reached" from each of the other states, as indicated by the arrows shown in FIG. 3, because of one or more causes. Note that for simplicity, the behavior transition model depicted in FIG. 3 is by no means complete.

Formally, the behavior transition model of an NE consists of
- a set of parameters P=$\{p_i\}$, i=1, . . . , n, where each parameter $p_i$ can take a set of values;
- a set of states S=$\{s_1, s_2, s_3, \ldots s_m\}$;
- $f$: $p_1 \times p_2 \times \ldots \times p_n \rightarrow S$ is a state mapping function;
- a set of causes C=$\{c_1, c_2, c_3, \ldots c_l\}$;
- a set of transitions T=$\{t_1, t_2, t_3, \ldots t_k\}$;
- g: T→C* is a transition labeling function, where C* is a power set of C; and
- λ: S×T→S is a behavior transition function In accordance with an important aspect of the present invention, a network trend model is derived by correlating the behavior transition models of individual NE's. Note that causes of transitions are often correlated. For example, cause C211 in NE 101 could lead to the occurrence of cause C215, which results in NE 101 being in state 3. More interestingly, one cause $c_i$ in a network element may trigger another cause $c_j$ in a neighboring network element to surface. We use a knowledge base, typically stored in a database within NMS 120, to record correlations resulting from causal relationships among causes. Let $NES_i$ be a network element set consisting of all neighboring network elements of $NE_i$. Formally, for each network element $NE_i$ with a set of causes $C_i$, and $$CU = C_i \cup \Big( \bigcup_{NE_j \in NES_i} C_j \Big)$$

being a union of the set of causes specified in the behavior models of $NE_i$ and all its neighboring network elements,
- h: $C_i \rightarrow CU$ is a causal function representing whether a cause in $C_i$ is dependent on the occurrence of another cause in CU.

Given a topological graph of a network representing the neighboring relationship among NE's, a behavior transition model for each NE, and a knowledge base based on the causal function h of all network elements, we can construct a network-wide behavior transition model. The states of this network-wide model are composite states that consist of states of individual NE's. The model has an initial state corresponding to a situation where all the NE's of the network are in their normal operating state, such as state 1 in FIG. 2. Associated with each state in the network-wide model is a set of causality trees that captures all possible explanations of why the network has come to this state from the initial state. The set is empty for the initial state.

Assume that only one NE will change state through each transition in the network-wide model. Let F be the NE that changes its state between two composite states $GS_i$ and $GS_j$. In the model of F there must be a transition T from F's state in $GS_i$ to its state in $GS_j$ such that T is labeled with a cause set C. Given the set of causality trees $CT_i$ associated with $GS_i$, we compute the set $CT_j$ for $GS_j$ as follows:
1. If $GS_j$ is a newly reached state, then let $CT_j=\emptyset$; otherwise let $CT_j$ be the causality tree set currently associated with $GS_j$. Let the new $CT_j=CT_j \cup CT_i$;
2. For each cause $c_k$ in C,
   If $c_k$ is not defined in h (that is, $c_k$ is independent of other causes),
      then add $c_k$ to the set $CT_j$ as the root of a new tree,
   Else if $h(c_k)$ has not appeared in any tree in $CT_j$,
      then ignore $c_k$,
   Else add $c_k$ as a child in all appearances of $h(c_k)$ in $CT_j$ The network-wide model captures how "glitches" may ripple through various network elements. Suppose that we can classify states of each NE into GOOD states and BAD states, then, any composite state that contains a bad NE state is a BAD state, too. By passively monitoring the operating status of NE's and traversing the transitions in the network-wide model, we can determine if certain deviations from all normal operating NE's are GOOD. If a path starting from initial state can go back to the initial state without passing through any BAD composite states, then the deviation is just a "glitch". Similarly, we can also determine if injecting control is advantageous in order to prevent the network from following a path to some BAD composite states.

Note that in a traditional rule-based fault diagnosis system, given a symptom (a status combination at the end of a transition), there may be rules that can be identified that state the causes that led to the symptom (labels of the transition). However, the status combination before the occurrence of the symptom (the status combination at the beginning of the transition) usually is not part of the rule, and neither is the history of transitions leading toward that particular transition. As a result, while rule-based systems may be adequate for fault diagnosis, they are not well suited for proactive management.

Turning now to the issue of an optimum status updating mechanism, one desired property of this aspect of the present invention is for NMS 120 to receive updates that are both frequent and detailed enough, without incurring substantial communication overhead. The key is to deciding when to update and what to update. The decision may come from NMS 120 itself, from individual NE's, or from both collaboratively. Advantageously, in accordance with an aspect of the present invention, a two-tier status updating mechanism is used in which NMS 120 and NE's 101–104 share the decision making responsibilities. NMS 120 coordinates reporting activities of multiple NE's by issuing local decision making policies to relevant NE's; each NE follows the policies to decide when and what to report to NMS 120. Using our mechanism, NMS 120 sets updating policies dynamically for each NE based on network status; each NE schedules its updates based on its own operating status as long as the schedule complies with the policies. Accordingly, the decision procedure at each NE is controllable by NMS 120 based on coarse network-wide status. For instance, an NE can raise an alarm anytime when certain particular measurement data changes "dramatically", and yet NMS 120 can dictate what is considered a dramatic change by setting some parameters for the NE's.

In order for NMS 120 to gather status information from NE's 101–104, each NE must either report to NMS 120 voluntarily or respond to a request from NMS 120; there is no way for NMS 120 to "passively observe" the behavior of an NE without the cooperation of the NE. In other words, as part of its design, an NE must report a selected set of status information upon triggering of some internal or external events. For example, an NE could report periodically based on periodic internal timeout events; it could raise alarms when some of its parameters exceed their threshold values, or when the NE has problems communicating with other NE's; or it could respond to polling requests from NMS 120.

Since NMS 120 maintains the behavior transition model of each NE, we associate with each state, and appropriately store in the NMS, a set of management options, such as updating frequency and needed data. The options may be contingent on the transitions into a state. Upon noticing an NE's behavior change, NMS 120 can choose an option based on a network-wide view and instruct the NE to change its reporting. In terms of implementation, it could simply mean activating one of the reporting options that the NE supports.

One alternative to the above arrangement is for each NE, through its management agent, to also maintain its own behavior transition model and to follow management options associated with individual states. This alternative would be ideal if, when each NE is designed, its operation could be characterized as having only one management option per state; hence such an NE would have only one straightforward choice.

Management information to be reported includes both measurement averaging over a period of time (such as percentage of rejected datagrams) and measurement at a particular time (such as available memory space). History of changes in measurement values is a useful information for trend analysis. Though NE's can keep track of changes of these measurements over time and report them to NMS 120, it is usually better for NMS 120 to do so itself, especially since NMS 120 would have a better perspective of trends in global changes.

NMS 120 depends on periodic updates from an NE to ensure that the NE is operating properly and that a communication path is working between NMS 120 and the NE. Hence it is important for NMS 120 to be aware of when to expect a next update from an NE. NMS 120 will obviously have the frequency information when it is also the instrumentality that is determining or establishing the reporting frequency parameters. On the other hand, should NE's change their own reporting pace based on their operating status, in each reporting message an NE should advantageously communicate with NMS 120 information indicating when the latest time would be to expect the next reporting message. Never the less, NE's must perform such changes with caution, especially when the network is congested.

In addition to changing the frequency of reporting management information, changing reporting details is another function addressed by the present invention. We organize management information hierarchically into several levels of details. During normal operation, each NE only reports management information at the coarse level. However, upon request, an NE, through its management agent, can report its status in more or less degree of details.

Consider again the simple behavior transition model depicted in FIG. 3 as an example. We can associate with State 301 an option of reporting throughput and blocking rate every 15 minutes. On the other hand, in a slightly overload situation in State 302, we may be interested in the percentage distribution of traffic entering an NE through different interfaces. We may also like to know the blocking rate of at each individual interface to determine if a particular admission policy is working properly. Therefore, we can associate with State 302 an option of reporting throughput and blocking rate respectively on a per interface basis, properly still every 15 minutes. State 303 represents either internal or external network problems. If the problem is within an NE, the NE may want to report its recovery progress. However, if the problem is likely to be outside of the NE, NMS 120 may only need to know from the NE how much traffic it is sending to its neighboring. NE's. Therefore, there could be multiple options associated with State 303. This is where a collaborative decision between NMS and each NE is preferred.

Figure 4:
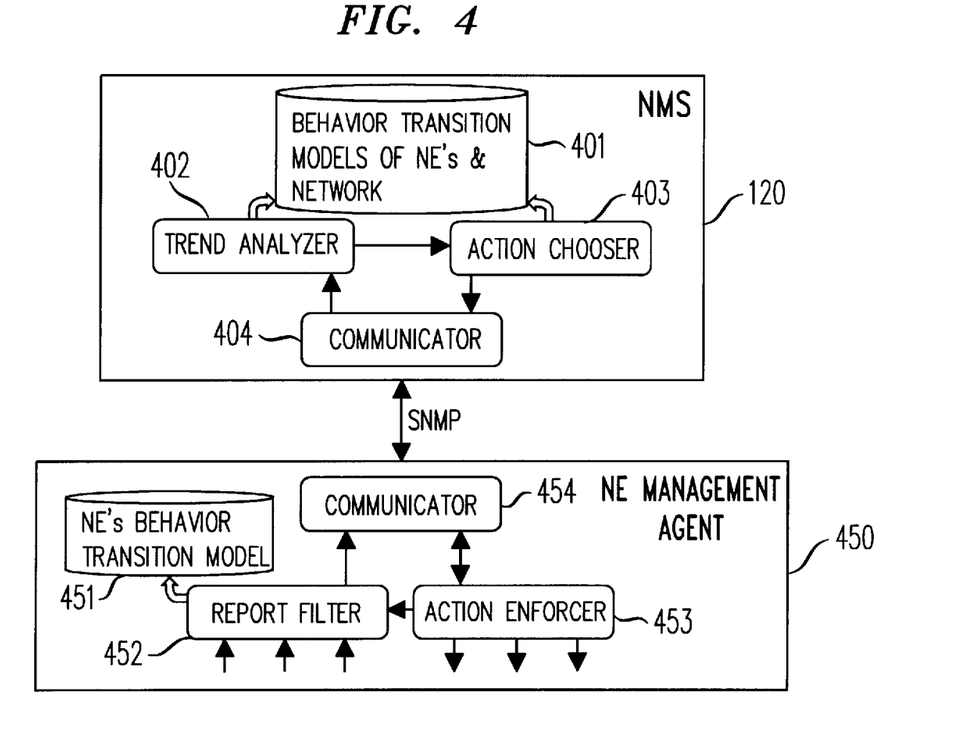
FIG. 4 illustrates, in block diagram form, the internal arrangement of an NE management agent and of an NMS arranged in accordance with the present invention, showing in particular how an NE, through its management agent, communicates updates to and from the NMS.

Turning now to FIG. 4, there is shown in block diagram form, the internal arrangement of a management agent (MA) 450 (associated with a particular NE, not shown) and of NMS 120, both as arranged in accordance with the present invention. FIG. 4 shows in particular how MA 450 communicates just-in-time management information to NMS 120; the communication process is itself controlled, to some degree, by NMS 120, as discussed more fully below. As depicted in FIG. 4, MA 450 includes a communicator 454, which acts as a communications interface to NMS 120. In addition to a database 451 which stores the behavior transition model for the NE associated with MA 450, MA 450 also includes a report filter 452 and an action enforcer 453. Report filter 452 receives raw MIB data, such as counter values and alarms from the associated network element and uses the behavior model in database 451 to filter out unnecessary reporting details. MIB values that are potentially of interest to NMS 120 based on the current status of the NE associated with MA 450 are then aggregated and forwarded to NMS 120 through communicator 454. On the other hand, action enforcer 453 receives action requests from NMS 120 via communicator 454 and processes them. The nature of the requests includes reconfiguring the network element, acquiring specific MIB values, or updating report filtering policies.

NMS 120, like MA 450, includes a communicator 404 which acts as a communications interface to MA 450. NMS 120 also has a database 401 that holds the derived network-wide model as well as the behavior transition models for all of the NE's in the network. In addition, NMS 120 includes a trend analyzer 402 and an action chooser 403. Upon receiving a status update from communicator 404, trend analyzer 402 extrapolates the movement of NE operating points and consults the network-wide model in database 401 to predict trends in future network transitions. Trend analyzer 402 then forwards trend analysis results to action chooser 403, which in turn consults database 401 to select management actions for relevant NEs based on the options associated with the states of their respective behavior transition models. Action chooser 403 then issues selected commands to external NE's through communicator 404. The communicators 404 and 454 are responsible for sending and receiving messages between NMS 120 and each MA within each NE, typically using SNMP format.

Figure 5:
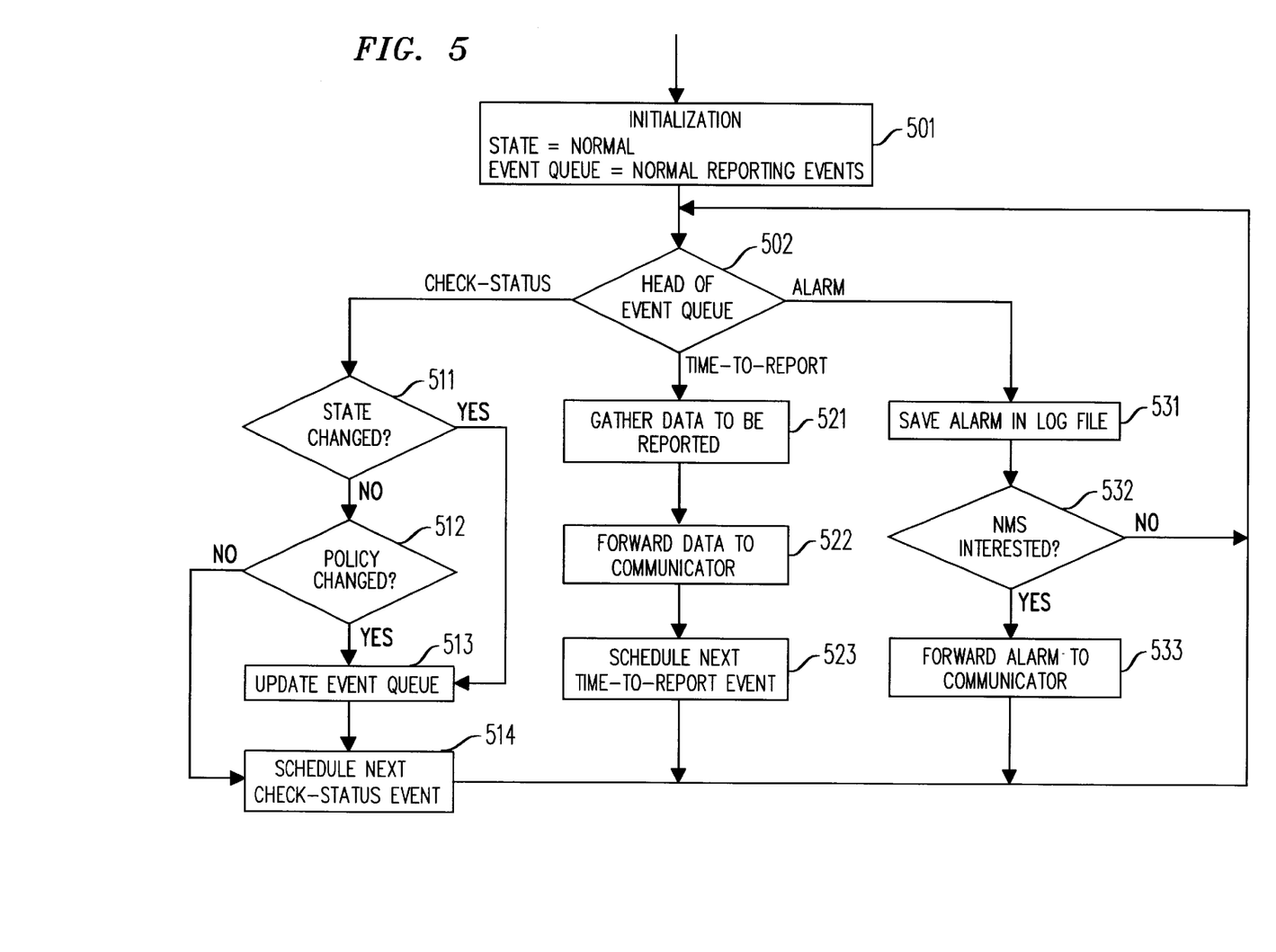
FIG. 5 illustrates a process for performing report filtering.

FIG. 5 depicts major functional flows of report filter 452 of FIG. 4, which executes an event loop. Initially (at step 501) report filter 452 assumes that the NE is in the normal operating state, and schedules reporting events associated with the normal state into an event queue. At step 502, the beginning of the event loop, report filter 452 then determines the type of the event appearing at the head of the event queue. For a check-status event that report filter 452 generates internally via a periodical timeout mechanism, report filter 452 reviews the state parameter values at step 511 to see if the NE has changed state. Had a state transition taken place, report filter 452 first updates the event queue at step 513 by removing from the queue the reporting events associated with the previous state, adding to it those associated with the new state, then proceeds to step 514 to add the next check-status event into the event queue. Otherwise, report filter 452 next checks at step 512 if policy information in database 451 has been updated since processing the last check-status event. Report filter 452 then proceeds to step 513 if some reporting policies have been updated, or to step 514 if everything remains unchanged.

In the case that the event at the head of the event queue is a time-to-report event, report filter 452 gathers the data to be reported at step 521, forwards the data to the communicator 454 at step 522, then schedules the next time-to-report event for the same set of data at step 523 according to the current reporting frequency.

Report filter 452 also receives NE generated alarms. For each alarm received, report filter 452 first saves the alarm information in a log file at step 531, then consults its current reporting policies in database 451 to decide if NMS 120 is interested in the alarm at step 532. Depending on the outcome of the decision box step 532, report filter 452 either forwards the alarm information to communicator 454 at step 533, or proceeds back to the beginning of the event loop at step 502. Report filter 452 also loops back to step 502 at the end of steps 513, 523, and 533.

Figure 6:
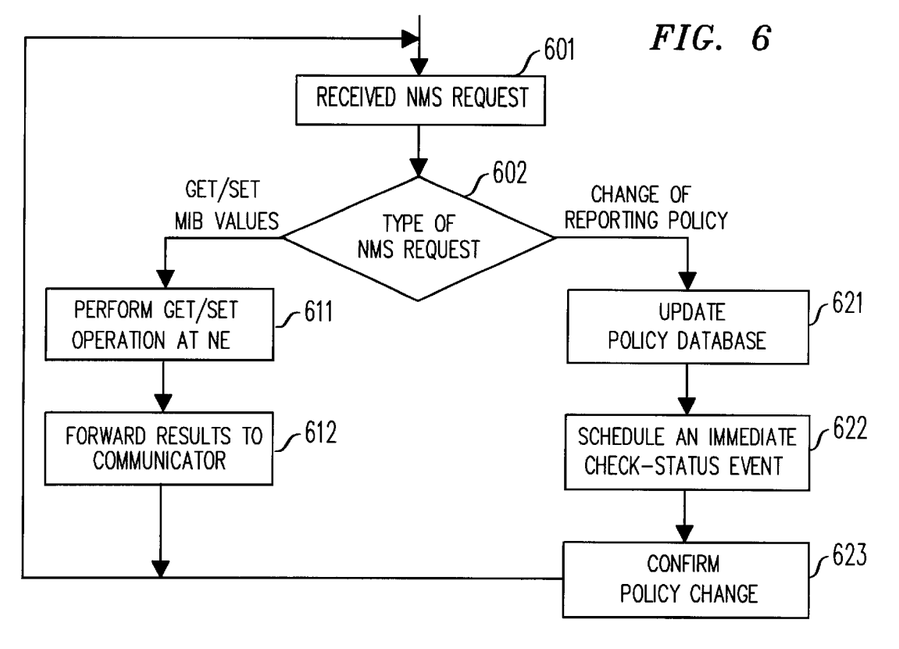
FIG. 6 illustrates a process for enforcing requests from an NMS.

FIG. 6, on the other hand, presents the functional flows of action enforcer 453, which also implements an event loop. The loop starts at step 601, where action enforcer 453 receives a request from NMS 120 via communicator 454. Action enforcer 453 then determines the type of the NMS request at step 602. For typical GET/SET management messages that get/set MIB values, action enforcer 453 performs requested operations at step 611 and forwards the results (either requested MIB values or confirmation of SET operations) at step 612 to communicator 454. For policy related messages, action enforcer 453 does the following: at step 621, it updates policy information in the database 451; at step 622, it schedules an immediate check-status event to force report filter 452 to take actions; and at step 623, it confirms policy changes to NMS 120 via communicator 454. At the end of steps 612 and 623, action enforcer 453 loops back to take on new NMS requests.

Figure 7:
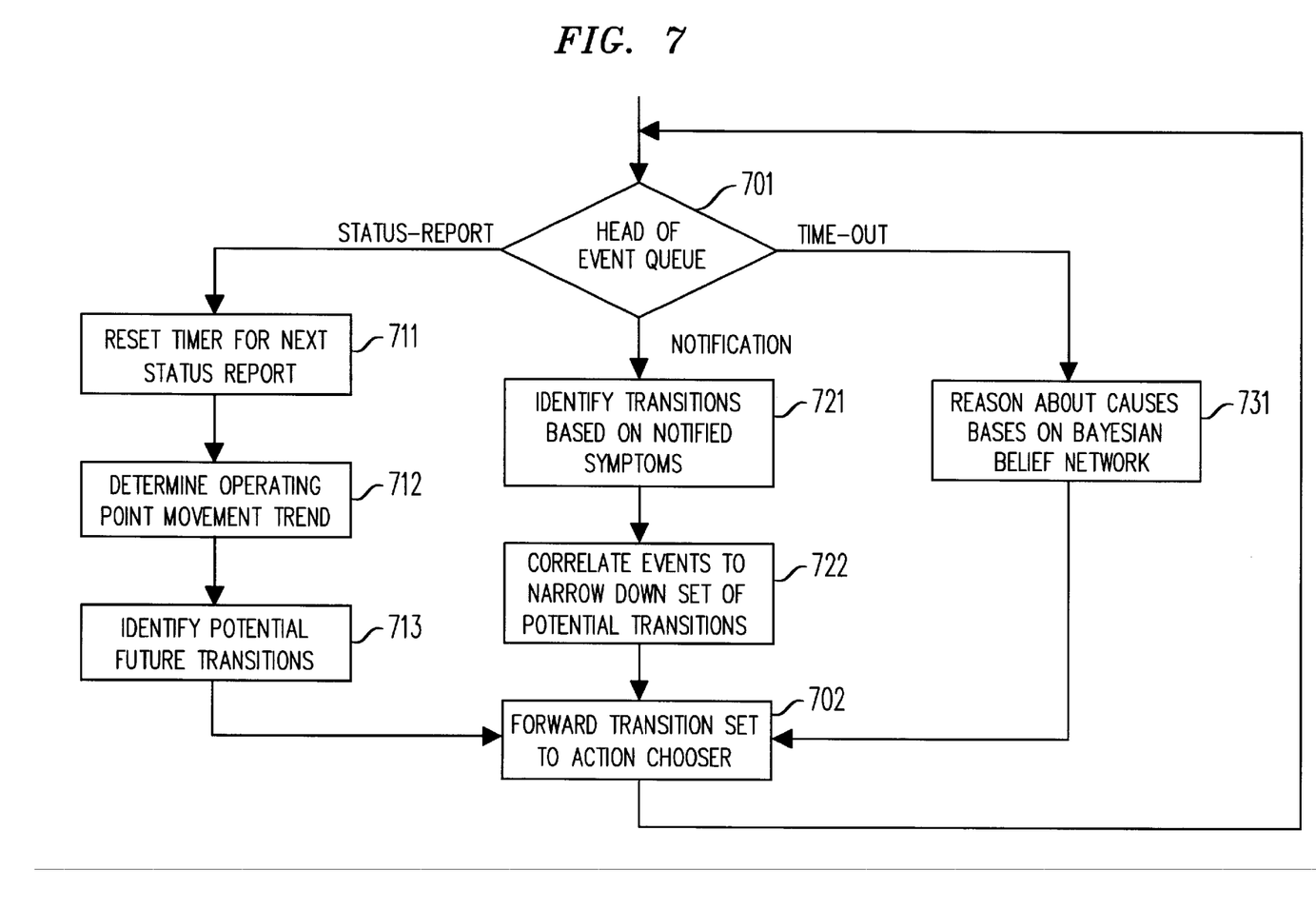
FIG. 7 illustrates a process in the NMS for analyzing network behavior trends for proactive management.

Moving on to the components of NMS 120, FIG. 7 depicts the major functional flows inside trend analyzer 402, which also implements an event loop. There are three types of events: a status-report event, meaning that trend analyzer 402 has received an "expected" update from some network element; a notification event, referring to alarms and other spontaneous events generated by some network elements and a timeout event, corresponding to the situation when some expected update has failed to show up on time. Trend analyzer 402 receives status-report events and notification events via communicator 404. On the other hand, it generates a timeout event through an internal timer mechanism.

At step 701, trend analyzer 402 checks the head of its event queue to determine the type of the event. For a status-report event from some NE, trend analyzer 402 first resets the timer for next status report at step 711. It then compares the newly received state parameter values of the NE with their previous values at step 712 to determine the operating point movement direction of the NE. Trend analyzer 402 does it by (1) forming a sequence of status reports as a piecewise stationary segment and (2) detecting changes within the segment based on auto-regressive models. Trend analyzer 402 at step 713 then consults the behavior transition models in database 401 to identify a set of potential future transitions and sorts them according to the likelihood of their occurrence. After that, trend analyzer 402 forwards the set of transitions to action chooser 403 at step 702.

For a notification event from some NE, trend analyzer 402, at step 721, matches notified symptoms against causes associated with transitions to select a set of potential transitions. Note that information about causes is part of the behavior transition models kept in database 401. At step 722, trend analyzer 402 correlates the notified symptoms with status reports and notifications from other NE's to further narrow down the set of possible transitions. Trend analyzer 402 then forwards the set of transitions to action chooser 403.

A timeout event regarding missing a status update from an NE implies several possibilities: the NE is down, the communication path between the NE and NMS 120 is down, a reporting message is lost, or the network is congested. Trend analyzer 402 determines likely causes based on a Bayesian belief network that accounts for the operating status of other network elements; this is done at step 731. Trend analyzer 402 then forwards the reasoning outcome, also in the form of a set of potential transitions, at step 702 to action chooser 403.

Figure 8:
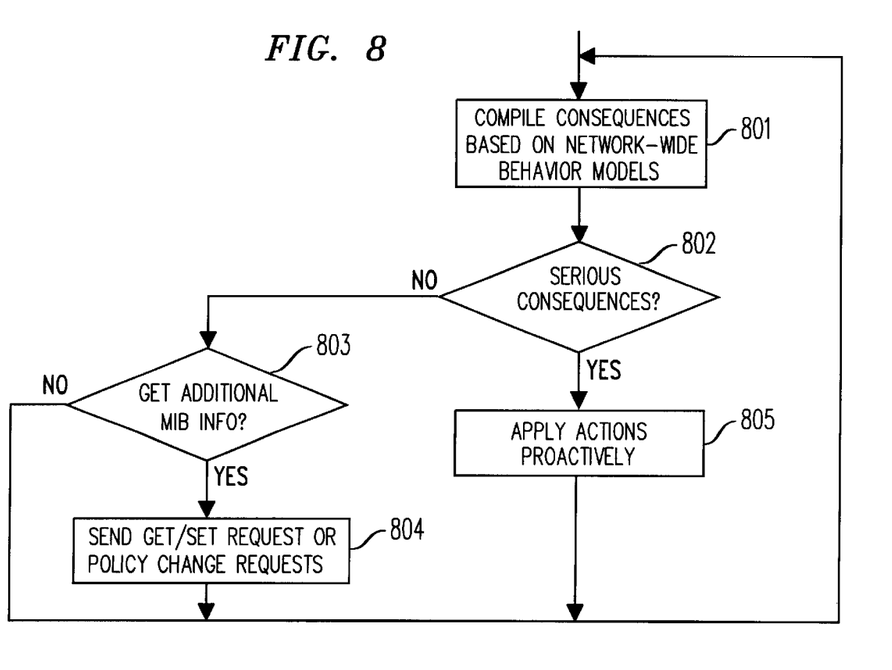
FIG. 8 illustrates a process in the NMS for choosing proper actions once information regarding NE behavior trends are available.

FIG. 8 depicts the main functions performed by action chooser 403. For each set of transitions it receives from trend analyzer 402, action chooser 403 compiles at step 801a set of consequences (meaning the set of states reachable in the network-wide behavior transition model), each with its likely causes, based on behavior transition models in database 401. Should there be no potential disastrous consequences, action chooser 403 has the option of either taking no actions or requesting finer-grain status reports. On the other hand, for any possible catastrophic consequence, action chooser 403 must take immediate actions to reverse the course. Steps 802, 803, 804, and 805 illustrate these functions. Action chooser 403, as stated previously, therefore maintains a knowledge base concerning the association between causes and actions, which is network specific.

Persons skilled in the art will recognize that various modifications and enhancements may be made to the present invention without departing from the spirit and scope of the disclosure above. Accordingly, the present invention is to be limited only by the appended claims.

What is claimed is:

1. A method of managing the operation of a network, said network including a plurality of interconnected network elements (NE's) and a network management system (NMS), said method comprising the steps of defining for each of said NE's, an associated set of (a) possible operating states based on a selected set of measurement parameters, and (b) transitions between said states, wherein said state transitions each have associated potential causes for said NE's to move from one operating state to another operating state, thereby formulating an element behavior macro model of said NE that (a) defines the operating regions of said NE as a function of combinations of selected parameter values, and (b) describes the causes for transitions among said operating region;

in each of said NE's, periodically transmitting a report including a selected set of measurement data, said state information and said transition information to said NMS;

correlating transitions for multiple ones of said NE's to derive a combined model of said network;

in said NMS, conducting a trend analysis based upon said combined model and said periodic reports from said NE's; and initiating management corrective actions in response to said transitions in said combined model and said trend analysis.

2. A method for managing a network that includes set of interconnected network elements (NEs) and a network management system (NMS), including the steps of establishing a management agent in each NE to interact with the NMS on behalf of the NE, formulating a behavior transition model based on NE status indicators, said model being an element behavior macro model that defines the operating regions of each NE as a function of combinations of selected parameter values and that describes the causes for transitions among said operating regions, updating the status indicators based on operating conditions, correlating ripple effects, and proactively managing said network using an early-warning model for proactive management.

3. The invention defined in claim 2 wherein the NMS and the agents of the NEs collaboratively decide a proper communication strategy in terms of status updating frequency and details.

4. The invention defined in claim 2 wherein communication strategies are adjusted based on macro models of individual NEs as well as of the entire network.

5. The invention defined in claim 2 wherein the management information communicated between the NE and the NMS can be fine-grained or coarse, depending on the status of said NE.

6. The invention defined in claim 2 wherein the frequency of said updating step depends on the status of said NE.

7. The invention defined in claim 2 wherein said updating rules are varied as a function of transitions among operating regions.

8. The invention defined in claim 7 wherein said changes in updating rules can be manually overridden.

9. A method of managing the operation of a network, said network including a plurality of interconnected network elements (NE's) and a network management system (NMS), each of said NE's having an associated set of possible abnormal operating states and a set of transitions between states, said set of abnormal operating states being based on a selected set of measurement parameters, wherein said state transitions represent potential causes for said NE's to move from one operating state to another operating state, and wherein said states and said transitions are used to formulate an element behavior macro model for each of said NE's, said method comprising the steps of in each of said NE's, periodically transmitting a report including a selected set of measurement data, to said NMS;

correlating transitions of said NE's to derive a combined model of said network;

in said NMS, conducting a trend analysis based upon said combined model and said periodic reports from said NE's; and initiating management corrective actions in response to said transitions in said combined model and said trend analysis.

10. The invention defined in claim 9 wherein said NMS instructs said NEs to alter either the frequency or the degree of details for the reporting performed in step (a).

11. The invention defined in claim 9 wherein said correlating step takes into account the effect of operating state changes in one NE on at least one other NE.

12. The invention defined in claim 9 wherein said management corrective actions includes probing, reconfiguration, recovery, or alarm notification.

13. The invention defined in claim 9 wherein said NEs periodically report a selected set of measurement data to said NMS.

14. The invention defined in claim 9 wherein said NMS instructs said NEs to alter frequency as well as the degree of details for the reporting.

15. The invention defined in claim 9 wherein each NE is modeled as a set of possible abnormal operating states and a set of transitions between said states.

16. The invention defined in claim 15 wherein said set of abnormal operating states is based on a selected set of measurement parameters.

17. The invention defined in claim 9 wherein said transitions represent potential causes for one of said NE's to move from one operating state to another operating state.

* * * * *